United States Patent
Pal et al.

(10) Patent No.: US 9,278,569 B2
(45) Date of Patent: Mar. 8, 2016

(54) INKJET RECORDING MEDIUM

(75) Inventors: Lokendra Pal, San Diego, CA (US);
Xulong Fu, San Diego, CA (US);
Ronald J. Selensky, Poway, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/233,800

(22) PCT Filed: Jul. 22, 2011

(86) PCT No.: PCT/US2011/044962
§ 371 (c)(1),
(2), (4) Date: Jan. 20, 2014

(87) PCT Pub. No.: WO2013/015767
PCT Pub. Date: Jan. 31, 2013

(65) Prior Publication Data
US 2014/0139601 A1 May 22, 2014

(51) Int. Cl.
| | |
|---|---|
| *B41M 5/00* | (2006.01) |
| *B41M 5/52* | (2006.01) |
| *B41M 5/50* | (2006.01) |
| *C04B 20/10* | (2006.01) |

(Continued)

(52) U.S. Cl.
CPC ............... *B41M 5/52* (2013.01); *B41M 5/506* (2013.01); *B05D 3/007* (2013.01); *B41M 5/508* (2013.01); *B41M 5/5218* (2013.01); *B41M 5/5245* (2013.01); *C04B 20/10* (2013.01); *C04B 41/009* (2013.01)

(58) Field of Classification Search
CPC .... B41M 5/506; B41M 5/508; B41M 5/5218; B41M 5/52; C04B 41/009; C04B 41/09; C04B 20/10; B05D 3/007
USPC ............ 428/32.21, 32.24, 32.25, 32.3, 32.34, 428/32.38; 347/243
See application file for complete search history.

(56) References Cited

U.S. PATENT DOCUMENTS

| | | |
|---|---|---|
| 5,985,424 A | 11/1999 | DeMatte et al. |
| 6,140,406 A | 10/2000 | Schliesman et al. |
| 2001/0014381 A1* | 8/2001 | Kaneko et al. ............. 428/195 |

(Continued)

FOREIGN PATENT DOCUMENTS

| | | |
|---|---|---|
| CN | 1579803 | 2/2005 |
| CN | 101104351 | 1/2008 |

(Continued)

OTHER PUBLICATIONS

Lee, Hak Lae, et al., "Surface sizing with cationic starch: its effect on paper quality and papermaking process", Tappi Journal, Mar. 2002, pp. 34-40.

(Continued)

*Primary Examiner* — Betelhem Shewareged
(74) *Attorney, Agent, or Firm* — Dierker & Associates, P.C.

(57) ABSTRACT

An inkjet recording medium includes a substrate, an intermediate layer disposed on the substrate, and an ink receiving layer disposed on the intermediate layer. The intermediate layer includes a binder, an inorganic pigment, and a pigment ink fixing agent chosen from divalent salts, multivalent salts, and combinations thereof. The ink receiving layer includes a non-film forming polymer, a binder chosen from any of water dispersible binders or water soluble binders, and a pigment.

18 Claims, 1 Drawing Sheet

(51) Int. Cl.
*B05D 3/00* (2006.01)
*C04B 41/00* (2006.01)

(56) References Cited

U.S. PATENT DOCUMENTS

| | | | |
|---|---|---|---|
| 2002/0012778 A1* | 1/2002 | Nakamura | B41M 5/506 428/32.24 |
| 2003/0008113 A1* | 1/2003 | Ohya et al. | 428/195 |
| 2003/0072925 A1* | 4/2003 | Kiyama et al. | 428/195 |
| 2005/0181946 A1 | 8/2005 | Tani | |
| 2007/0218254 A1 | 9/2007 | Zhou et al. | |
| 2007/0237909 A1 | 10/2007 | McManus | |
| 2009/0109270 A1 | 4/2009 | Kobayashi | |
| 2009/0123676 A1 | 5/2009 | Kato et al. | |
| 2009/0126584 A1 | 5/2009 | Nakano | |
| 2014/0139601 A1* | 5/2014 | Pal et al. | 347/105 |

FOREIGN PATENT DOCUMENTS

| | | | |
|---|---|---|---|
| CN | 101687422 | 3/2010 | |
| EP | 1228889 | 8/2002 | |
| EP | 1346842 | 9/2003 | |
| JP | 04-125187 | 4/1992 | |
| JP | H07299959 | 11/1995 | |
| JP | 2005-119067 | 5/2005 | |
| JP | 2007210341 A * | 8/2007 | B41M 5/00 |
| WO | WO 2009/012912 | 1/2009 | |

OTHER PUBLICATIONS

Provost, John, et al., "Interactions of Digital Inks with Textile and Paper Substrates in Ink Jet Printing", Provost Ink Jet Consulting Ltd., 2009, 9 pgs.

Extended European Search Report dated Apr. 14, 2015. EP Application No. 11870133.3.

* cited by examiner

INKJET RECORDING MEDIUM

BACKGROUND

The present disclosure relates generally to inkjet recording mediums.

Media suitable for use with inkjet printing often include one or more coating layers formed on a substrate to enhance various properties including printing performance and image quality, to name a couple. For instance, some coating layers may contain a pigment (such as, e.g., silica) that is specifically chosen to enhance ink absorption, while other coating layers may contain another pigment (such as, e.g., alumina) that is specifically chosen to enhance gloss.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in conjunction with other drawings in which they appear.

DETAILED DESCRIPTION

Some improvement in pigment-based image quality may be achieved, for example, by incorporating a salt (such as a calcium salt) into one or more coating layers of a medium. However, it has been found that, in some instances, the presence of the salt in the outer-most coating layer(s) of the medium may affect the integrity of the image (produced by printing an ink on the medium), at least in part because the salt may cause pigment particles of the colorant of the ink to non-uniformly be distributed across the surface of the medium. In many cases, image gloss is significantly affected.

Examples of the inkjet recording medium as disclosed herein include at least two coating layers, where the intermediate layer includes a pigment ink fixing agent chosen from a divalent salt, a multivalent salt, and combinations thereof. The inventors of the present disclosure have found that the examples of the medium exhibit at least desirable durability and gloss despite the presence of a salt in the intermediate layer. It has further been found that, in some cases, the specific combination of the components of the coating layers of the medium also achieves improved image quality upon forming a print (i.e., when an image is formed on the medium via an inkjet printing process or other suitable printing process). Without being bound to any theory, it is believed that the salt present in the intermediate layer (i.e., the layer between the substrate of the medium and its outer-most or top layer) fixes pigment particles of a pigment ink established on the medium during printing. More specifically, upon printing, the pigment particles penetrate through the outer-most layer (which is a thin, top coating layer) and fixes or otherwise attaches to the intermediate layer via the salt present therein.

The inventors believe that the fixing of the pigment particles via the presence of the salt in the intermediate layer advantageously improves controlled ink spreading across the surface of the medium (e.g., horizontally if the medium is laying on a flat surface), as well as controlled penetration of the pigment particles through the coating layer(s) of the medium. The controlled ink spreading and/or the controlled ink penetration advantageously improve(s) the medium's resistance to bleed and its coalescence.

It is further believed that incorporating the salt in the intermediate layer of the medium is more effective than incorporating the salt in the outer-most layer. This is due, at least in part, to the fact that the salt fixes pigment particles of a pigment ink on the surface of the medium (i.e., to the outer-most layer), and thus the pigment particles will stay on the surface of the medium. It is believed that, in these cases, the pigment particles may not be uniformly distributed across the medium, and may be easily removed due to smudging or the like. Thus, in these cases, the print formed by printing the ink on the medium may exhibit relatively poor wet and/or dry smudge performance and image gloss.

The examples of the inkjet recording medium are also compatible with pigment- and dye-based inkjet inks, and may be used for a variety of inkjet printing processes, including web-press printing.

Figure 1:
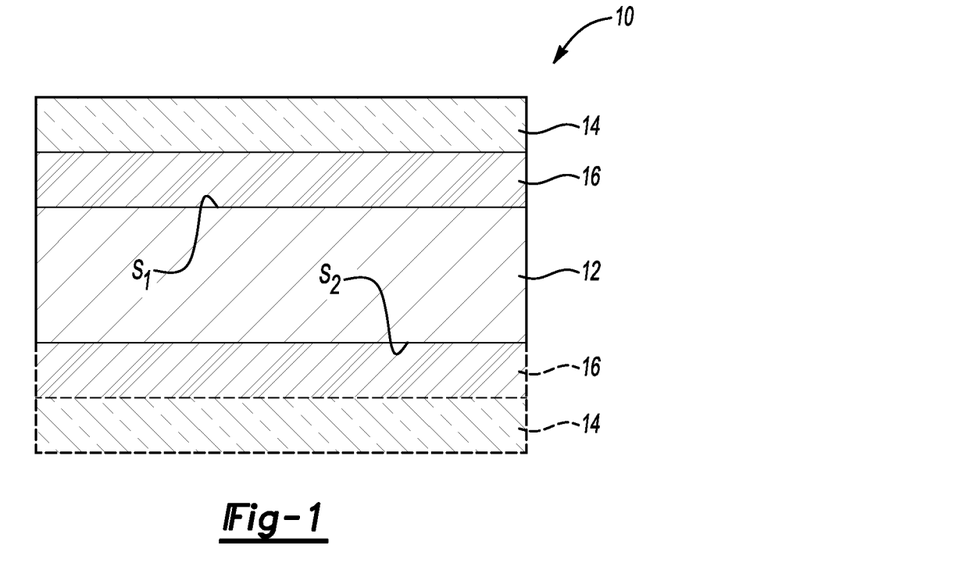
FIG. 1 is a schematic cross-sectional view (which is not drawn to scale) of an example of an inkjet recording medium according to the present disclosure.

The inkjet recording medium 10 depicted in FIG. 1 includes a substrate 12, an intermediate layer 16 formed on the substrate 12, and an ink receiving layer 14 formed on the intermediate layer 16. In an example of the medium 10, the intermediate layer 16 is formed on a single surface (e.g., $S_1$) of the substrate 12, and the ink receiving layer 14 is formed on the intermediate layer 16. In another example, the medium 10 includes two intermediate layers 16 (each formed on opposed surfaces $S_1$, $S_2$ of the substrate 12) and an ink receiving layer 14 formed on each of the intermediate layers 16. This example is shown in dotted lines in FIG. 1. Further, the intermediate layer 16 may include a single intermediate layer or multiple intermediate layers (e.g., two or more intermediate layers). Further, if the intermediate layer 16 is formed on the opposed surfaces $S_1$, $S_2$, the ink receiving layer 14 formed on each of the intermediate layers 16 (i.e., the ink receiving layers 14 are formed on the substrate surfaces $S_1$, $S_2$ with the intermediate layer 16 therebetween), the ink receiving layer 14 may also include a single ink receiving layer or multiple ink receiving layers (e.g., two or more ink receiving layers).

It is to be understood that, as used herein, the terms "formed on", "disposed on", "deposited on", "established on", and the like are broadly defined herein to encompass a variety of divergent layering arrangements and assembly techniques. These arrangements and techniques include i) the direct attachment of the material layer to another material layer with no intervening materials layers therebetween, and ii) the attachment of one material layer to another material layer with one or more material layers therebetween, provided that the one layer being "formed on", "disposed on", "deposited on", or "established on" the other layer is somehow supported by the other layer (notwithstanding the presence of one or more additional material layers therebetween).

Further, the phrases "formed directly on", "disposed directly on", "deposited directly on", "established directly on" and/or the like are broadly defined herein to encompass a situation (s) wherein a given material layer is secured to another material layer without any intervening material layers therebetween. Any statement used herein which indicates that one layer of material is on another layer is to be understood as involving a situation wherein the particular layer that is "on" the other layer in question is the outermost of the two layers relative to incoming ink materials being delivered by the printing system of interest. It is to be understood that the characterizations recited above are to be effective regardless of the orientation of the recording medium materials under consideration.

The substrate 12 for the medium 10 may be chosen from any raw base containing any type of pulp fibers, and may be referred to herein as a pulp-based substrate or a cellulose fiber-based substrate. The substrate 12 may be made from pulp fibers derived from wood, such as from hardwood trees (e.g., deciduous trees (angiosperms) such as birch, oak, beech, maple, and eucalyptus) and/or softwood trees (e.g., coniferous trees (gymnosperms) such as varieties of fir, spruce, and pine, as for example loblolly pine, slash pine, Colorado spruce, balsam fir and Douglas fir), and these pulps may be prepared via any known pulping process. The substrate 12 may also be made from fibers derived from non-wood (such as bagasse, straw, and bamboo) or from recycled fibers. The raw base for the substrate 12 may be made with wood containing fibers such as thermomechanical pulp (TMP) fibers, chemithermomechanical pulp (CTMP) fibers, refiner mechanical pulp fibers (RMP), ground wood (GW) pulp fibers, and/or the like. Further, the raw base may include one or more fillers to control the physical properties of the substrate 12. Examples of fillers include carbonates (e.g., ground calcium carbonate and precipitated calcium carbonate), titanium dioxide, clays (e.g., kaolin clay), silicates, oxides, zeolites, talc, and combinations thereof. The filler may be added to the fiber structure of the raw base, or may be added inside a size/film press.

In an example, the substrate 12 may include some additives, some examples of which include internal sizing agents, dry strengthening agents, wet strengthening agents, fixers, pH adjusters, and/or coloring agents. Examples of internal sizing agents include fatty acids, metal salts of fatty acids, alkyl ketene dimmer emulsification products, epoxidized higher fatty acid amides, alkenyl acid anhydride emulsification products and rosin derivatives, alkylsuccinic acid anhydride emulsification products and rosin derivatives, and/or combinations thereof. Examples of dry strengthening agents that may be used include anionic polyacrylamides, cationic polyacrylamides, amphoteric polyacrylamides, polyvinyl alcohol, cationized starch, vegetable galactomannan, and/or combinations thereof. Wet strengthening agents may, for example, include polyaminepolyamide epichlorohydrin resins, and fixers may, for example, include water-soluble aluminum salts, aluminum chloride, and/or aluminum sulfate. Further, examples of the pH adjuster include sodium hydroxide, sodium carbonate, and/or sulfuric acid, and examples of coloring agents include pigments, coloring dyes, and/or fluorescent brighteners.

The substrate 12 may otherwise be chosen from coated substrates; i.e., those having a coating layer formed on the pulp-based or fiber-based substrate. This coating layer may include inorganic pigments, natural or synthetic binders, and possibly other additives. Examples of the coating layer may not include any pigment ink fixing agent. Such coating layers may provide a smoother substrate surface for application of the intermediate layer(s) 16 thereon. Examples of coated substrates 12 may include various offset papers (such as, e.g., STERLING® Ultra available from NewPage Corp. (Miamisburg, Ohio) and UTOPIA™ Two paper available from Appleton Coated, Inc. (Kimberly, Wis.)).

Other examples of the substrate 12 may include photobase substrates; i.e., those having a barrier polymer layer extrusion coated on a pulp-based or fiber-based raw base. This barrier polymer layer may include petroleum based polymers (such as low density polyethylene (LDPE), high density polyethylene (HDPE), and polyvinyl alcohol (PVA)) and agro-based polymers (such as poly lactic acid (PLA), starches, polyhydroxylalkanoate (PHA), polyhydroxybutyrate (PHB)), and combinations thereof. The substrate 12 may also be chosen from a polymer-based or film-based substrate, such as polyethylene terephthalate (PET), cellulose acetate, and cellulose nitrate.

It is to be understood that the substrate 12 being formed from any of the examples above renders the substrate 12 as a base layer.

In an example, the basis weight of the substrate 12 ranges from about 30 gsm to about 350 gsm. In another example, the basis weight of the substrate 12 ranges from about 50 gsm to about 200 gsm. In yet another example, the basis weight of the substrate 12 is about 75 gsm.

In the example of the medium 10 shown in FIG. 1, the intermediate layer 16 is a pre-coat layer; i.e., a layer that is formed on the substrate 12 prior to the ink receiving layer 14 either inline on a paper machine, or offline of a coating machine. The intermediate/pre-coat layer 16 is generally formed from a mixture of a binder and an inorganic pigment, and has a coat weight ranging from about 5 gsm to about 20 gsm. In another example, the coat weight of the pre-coat layer ranges from about 10 gsm to about 20 gsm. In yet another example, the coat weight of the pre-coat layer is about 15 gsm.

The binder for the pre-coat layer 16 is basically used to hold the inorganic pigment particles of the layer together. Some examples of the binder include water dispersible binders such as acrylic polymers, acrylic copolymers, vinyl acetate latex, polyesters, vinylidene chloride latex, styrene-butadiene copolymer latex, styrene/n-butyl acrylate copolymer (such as, e.g., ACRONAL® S728, available from BASF Corp., Ludwigshafen, Germany), and/or acrylonitrile-butadiene copolymer latex. Other examples of the binder include water soluble binders such as polyvinyl alcohol (such as MOWIOL® 4-98, available from Kuraray America, Inc., Houston, Tex.), polyvinyl acetates, starches, gelatin, celluloses, and/or acrylamide polymers. The binder may, in an example, be present in the pre-coat layer in an amount ranging from about 2.5 wt % to about 15 wt % of the pre-coat layer. In another example, the binder is present in the pre-coat layer in an amount ranging from about 7 wt % to about 12 wt % of the pre-coat layer.

The inorganic pigment for the pre-coat layer 16 may be chosen from carbonates (e.g., calcium carbonate such as HYDROCARB®, available from OmyaAG, Oftringen, Switzerland and OPACARB® A40, available from Specialty Minerals, Inc., NewYork, N.Y.), clays (e.g., kaolin clays, calcined clays, engineered clays, and treated clays), calcium carbonates (e.g., precipitated calcium carbonate, ground calcium carbonate, and treated calcium carbonate) talc, titanium dioxide, zeolites, calcium sulfate, silicas (e.g., fumed silica, colloidal silica, silica gels, treated silicas), aluminas, silicates, aluminum trihydrate (ATH), and combinations thereof. In an example, the inorganic pigment is present in an amount ranging from about 60 wt % to about 97 wt % of the pre-coat layer 16. In another example, the inorganic pigment is present in an amount ranging from about 80 wt % to about 90 wt % of the pre-coat layer 16.

The pre-coat layer 16 also includes a pigment ink fixing agent to fix pigment-based inks printed on the medium 10. In an example, the pigment ink fixing agent is chosen from a water soluble divalent salt and/or a water soluble multivalent salt. The salt in the pre-coat layer 16 crashes out pigment dispersions from ink solutions (e.g., pigment inkjet inks), and the cations of the salt interact with the anionic particles (i.e., the colorant) of the pigment dispersion to fix the particles to the pre-coat layer 16.

Some specific examples of the pigment ink fixing agent include a salt of any metals of Group I, Group II, and Group III of the Periodic Table of Elements, as well as a salt of any of the transition metals. Some examples of metal cations include calcium ions, copper ions, nickel ions, magnesium ions, zinc ions, barium ions, iron ions, aluminum ions, and chromium ions; and some examples of anions for forming the metal salt include chloride ions, iodide ions, bromide ions, nitrate ions, phosphate ions, chlorate ions, acetate ions, propionates, formates, oxalates, and/or combinations thereof.

In an example, the pigment ink fixing agent may be chosen from calcium chloride, magnesium chloride, magnesium acetate, magnesium propionate, magnesium sulfate (e.g., Epsom salt), and combinations thereof. Further, the pigment ink fixing agent may, in an example, be present in an amount ranging from about 0.5 wt % to about 25 wt % of the pre-coat layer 16. In another example, the pigment fixing agent is present in an amount ranging from about 1 wt % to about 21 wt % of the pre-coat layer 16. In a further example, the pigment ink fixing agent is present in an amount ranging from about 5 wt % to about 15 wt % of the pre-coat layer 16. In yet another example, the pigment ink fixing agent is present in an amount ranging from about 5 wt % to about 10 wt % of the pre-coat layer 16.

In an example, the medium 10 may further contain at least one additional layer (not shown in FIG. 1) formed between the substrate 12 and the ink receiving layer 14. This additional layer may have the same formulation of the pre-coat layer 16 but without the pigment ink fixing agent.

The ink receiving layer 14 of the inkjet recording of the examples of the inkjet recording medium 10 in FIG. 1 is a porous layer that is formed on the intermediate, pre-coat layer 16. The ink receiving layer 14 is a relatively thin layer, having a coat weight ranging from about 0.3 gsm to about 10 gsm. In another example, the coat weight of the ink receiving layer 14 ranges from about 1 gsm to about 3 gsm. In still another example, the coat weight of the ink receiving layer 14 is about 1.5 gsm.

In an example, the ink receiving layer 14 is formed from a mixture of a non-film forming polymer, a binder, and a pigment, and the mixture has, in an example, a pH ranging from about 3 to about 9. In another example, the mixture has a pH ranging from about 5 to about 7. In other examples, the ink receiving layer 14 also includes a dye-ink fixing agent, a slip aid (such as MICHEMSHIELD® 253 or MICHEM® Emulsion 93935 available from Michelman, Cincinnati, Ohio), a cross linker (such as CUERSAN™ 200 available from BASF Corp., Charlotte, N.C.), and/or one or more additives. The additives may be chosen from optical brighteners (such as TINOPAL® ABP-A available from Ciba Specialty Chemicals, Basel, Switzerland), dyes (such as IRGALITE® Blue Dye also available from Ciba Specialty Chemicals), lubricants, dispersants (such as ACUMER™ 9300 available from the Dow Chemical Co., Midland, Mich.), defoamers (such as AC-22 available from Performance Process, Inc., Mundelein, Ill. and ANTISPUMIN® 7100 available from Evonik-Degussa GmbH, Germany), and buffering agents.

The non-film forming polymer may, in an example, be chosen from a cationic polymer such as non-film forming acrylic polymers and/or non-film forming styrene-acrylic polymers. It is believed that the non-film forming cationic polymer is best used as a fixing agent, and form relatively uniform porous layers. Further, the selection of the cationic polymer is such that the ink receiving layer 14 exhibits a relatively uniform gloss, and further provides desired adhesion to the colorant of the ink forming the image on the medium (e.g., a dye, a pigment, etc.). For pigment inks, it is believed that at least the desired adhesion results in desired resistance to smearing and/or smudging. The cationic polymers generally have an average particle size (i.e., effective diameter, assuming that the particles are not perfectly spherical) ranging from about 0.1 µm to about 2 µm. In another example, the cationic polymers have an average particle size ranging from about 0.1 µm to about 1 µm. Additionally, the cationic polymer has a zeta potential (ZT) ranging from about +1 mV to about +50 mV, and in another example, the zeta potential is greater than about +25 mV. One example of the cationic polymer is RAYCAT® 78, which is a polyacrylic emulsion polymer commercially available from Specialty Polymers, Inc., Woodburn, Oreg., and which has a zeta potential of about +34 mV.

The non-film forming polymer may, in another example, be chosen from non-film forming anionic polymers such as non-film forming anionic acrylic polymers and/or non-film forming anionic styrene-acrylic polymers. The anionic polymer has, in an example, a zeta potential (ZT) ranging from about −1 mV to about −60 mV. One example of the anionic polymer is RAYCAT® 30S, which is an acrylic emulsion polymer commercially available from Specialty Polymers, Inc., Woodburn, Oreg., and which has a zeta potential of about −58 mV. Another example of the anionic polymer is JONCRYL® ECO 2189, which is a styrene-acrylic polymer commercially available from BASF Corp., Ludwigshafen, Germany, and which has a zeta potential of about −48 mV.

The non-film forming polymer (whether it is chosen from a cationic polymer or an anionic polymer) has a glass transition temperature ($T_g$) ranging from about 80° C. to about 150° C., and in another example, the glass transition temperature ($T_g$) ranges from about 105° C. to about 120° C. In still another example, the non-film forming polymer has a glass transition temperature ($T_g$) ranging from about 90° C. to about 135° C.

In an example, the non-film forming polymer is present in an amount ranging from about 20 wt % to about 87 wt % of the ink receiving layer 14, and in another example, is present in an amount ranging from about 30 wt % to about 80 wt %. In still another example, the non-film forming polymer is present in an amount ranging from about 40 wt % to about 70 wt %.

As previously mentioned, the ink receiving layer 14 includes a binder. The binder may be used, for instance, to hold the pigment particles of the ink receiving layer 14 together. The binder may be chosen from water dispersible binders (such as water dispersible latexes) and/or water soluble binders. Some specific examples of water dispersible binders include acrylic polymers, acrylic copolymers, vinyl acetate latex, polyesters, vinylidene chloride latex, styrene-butadiene copolymer latex, styrene/n-butyl acrylate copolymer (such as, e.g., ACRONAL® S728, available from BASF Corp., Ludwigshafen, Germany), and/or acrylonitrile-butadiene copolymer latex. Examples of water soluble binders include polyvinyl alcohol (such as MOWIOL® 4-98 and MOWIOL® 40-88, both available from Kuraray America, Inc., Houston, Tex.), polyvinyl acetates, starches, gelatin, celluloses, and/or acrylamide polymers. In an example, the amount of binder present ranges from about 3 wt % to about 15 wt % of the ink receiving layer 14. In another example, the amount of binder present ranges from about 5 wt % to about 10 wt % of the ink receiving layer 14.

The pigment for the ink receiving layer 14 may be chosen from inorganic pigments, examples of which include carbonates (e.g., calcium carbonate such as HYDROCARB®, available from Omya AG, Oftringen, Switzerland and OPACARB® A40, available from Specialty Minerals, Inc., New York, N.Y.), clays (e.g., kaolin clays, calcined clays, and engineered clays), talc, titanium dioxide, zeolites, calcium sulfate, silica, alumina, silicates, aluminum trihydrate (ATH), and combinations thereof. The pigment may, in an example, be present in an amount ranging from about 10 wt % to about 77 wt % of the ink receiving layer 14. In another example, the pigment may be present in an amount ranging from about 20 wt % to about 70 wt %, and in yet another example, ranges from about 30 wt % to about 50 wt % of the ink receiving layer 14.

A slip aid may be incorporated into the ink receiving layer 14, for example, to reduce sheet-to-sheet friction and to improve the scratch resistance of the medium 10. Examples of the slip aid include polyethylene (such as SLIP-AYD® SL 1618 (Elementis Specialties (Hightstown, N.J.)), a polyamide (such as ORGASOL® 2002 ES3 NAT 3 (Arkema Inc., Philadelphia, Pa.)), high density polyethylene (such as ULTRALUBE® E846 (Keim-Additec Surface GmbH, DE)), MICHEMSHIELD® 251, MICHEMSHIELD® 253, MICHEMSHIELD® 422, and MICHEM® Emulsion 93935, all of which are available from Michelman, Inc. Cincinnati, Ohio, and/or combinations thereof. The slip aid may be present in an amount ranging from about 0.1 wt % to about 1 wt % of the ink receiving layer 14.

Some specific example formulations of the ink receiving layer 14 are provided in Table A below:

TABLE A

Example formulations of the ink receiving layer 14 (data shown in dry parts)

| Formulation | Example 1 | Example 2 |
|---|---|---|
| RAYCAT ® 78 | 50 | — |
| RAYCAT ® 30S | — | 50 |
| OPACARB ® A40 | 50 | 50 |
| ACRONAL ® S728 | 3 | 3 |
| MOWIOL ® 4-98 | 3 | 3 |
| CUERSAN 200 | 0.5 | 0.5 |
| MICHEM ® Emulsion 93935 | 1 | 1 |
| OBA | 0.5 | 0.5 |
| Blue Dye | 0.005 | 0.005 |

Figure 2:
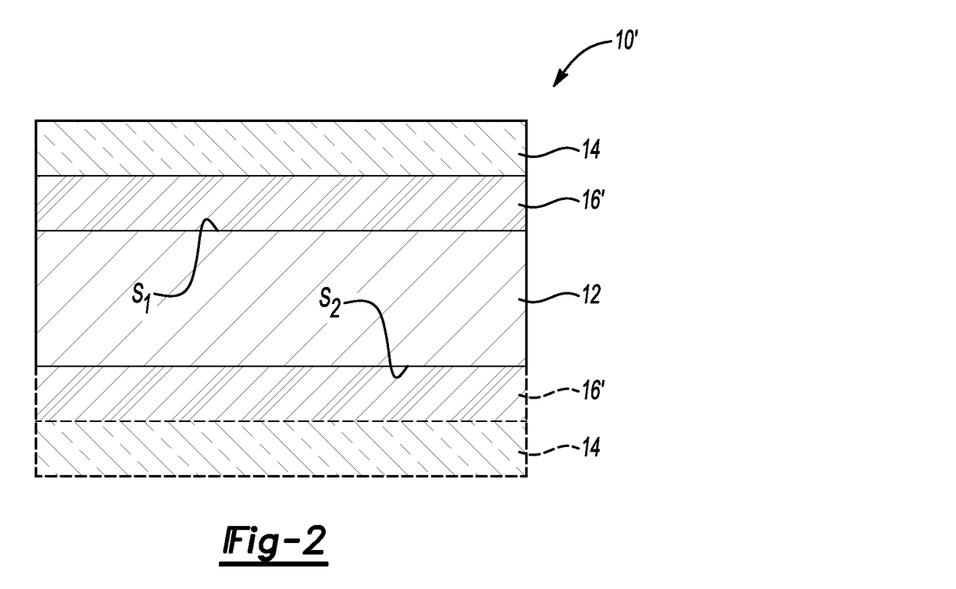
FIG. 2 is a schematic cross-sectional view (which is also not drawn to scale) of another example of an inkjet recording medium according to the present disclosure.

Another example of the inkjet recording medium 10' is schematically depicted in FIG. 2. In this example, the medium 10' includes the substrate 12, an intermediate layer 16' disposed on one surface (e.g., $S_1$) or both surfaces ($S_1$, $S_2$) of the substrate 12, and an ink receiving layer 14 disposed on the intermediate layer(s) 16', as previously described for the inkjet recording medium 10. It is to be understood that the substrate 12 and the ink receiving layer 14 are the same as previously described for the medium 10; however the intermediate layer is a surface sizing layer, and is designated herein by reference numeral 16'.

The surface sizing layer 16' is formed on the substrate 12 inline on a paper machine, and the surface sizing layer differs from the pre-coat layer at least in terms of its coat weight. In an example, the surface sizing layer has a coat weight that is less than 5 gsm, and in another example, the coat weight of the surface sizing layer ranges from about 1 gsm to about 3 gsm. The surface sizing layer 16' may be formed from the same components used to form the pre-coat layer 16 described above, however the loading of these components may differ. In an example, the surface sizing layer includes a binder present in an amount ranging from about 40 wt % to about 98 wt % of the surface sizing layer, an in another example, ranges from about 55 wt % to about 85 wt %. The surface sizing layer 16' further includes an inorganic pigment present in an amount ranging from about 1 wt % to about 20 wt % of the surface sizing layer, and in another example, ranges from about 10 wt % to about 20 wt %. Further, the surface sizing layer 16' includes a pigment ink fixing agent present in an amount ranging from about 1 wt % to about 50 wt % of the surface sizing layer, and in another example, ranges from about 5 wt % to about 25 wt % of the surface sizing layer 16'.

In an example, the medium 10' may further contain an additional layer (not shown in FIG. 2) formed between the substrate 12 and the ink receiving layer 14. This additional layer may have the same formulation of the surface sizing layer 16' but without the pigment ink fixing agent.

The inkjet recording medium 10, 10' may be made by forming (e.g., coating) the intermediate layer 16, 16' on the substrate 12 (such as on the surface $S_1$ alone, or on the surfaces $S_1$, $S_2$), and then forming (e.g., coating) the ink receiving layer 14 on the intermediate layer 16, 16'. In this example, the intermediate layer 16, 16' may be formed by mixing the intermediate layer components together and then applying the mixture onto the substrate surface $S_1$ (FIG. 2) or surfaces $S_1$, $S_2$. The mixture of intermediate layer components may be applied on the substrate 12 via a metered-size press, a puddle-size press, roll-coating, conventional slot-die processing, blade coating, slot-die cascade coating, curtain coating, rod coating, and/or gravure air knife coating. The layers may be applied either offline or inline depending on machine configurations. In some instances, spray-coating, immersion-coating, and/or cast coating techniques may also be used.

The ink receiving layer 14 may be formed by mixing the ink receiving layer components together (e.g., in a mixing tank with a mixing blade), and the mixture is applied onto the intermediate layer 16, 16'. The mixture of the ink receiving layer components may be applied using any of the application methods described above.

To further illustrate the present disclosure, examples are given herein. It is to be understood that these examples are provided for illustrative purposes and are not to be construed as limiting the scope of the disclosure.

EXAMPLES

A series of coated paper samples were prepared using coating compositions having the formulas set forth in Table 1 below. Tables 2-4 respectively provide the various formulations of the ink receiving layer (IRL), the intermediate layer (IL), and the control samples (CTL). In all of the samples of Table 1, the components were mixed together in a beaker using bench-top mixing equipment. A standard 75 gsm coated substrate (including a standard starch and ground calcium carbonate (GCC) coating) was used for drawdowns using a bench-top blade coater and Mayer rods. The samples were then calendered at 1000 psi and 115° F. at different nips to achieve a desired gloss.

TABLE 1

Examples of the paper disclosed herein and Control Examples

| Sample (PS = Paper Sample) | Image Receiving Layer | | Intermediate Layer | | Super Calendering No. of Nips |
|---|---|---|---|---|---|
| | Formulation ID | Coat Weight (gsm) | Formulation ID | Coat Weight (gsm) | |
| PS1 | IRL F1 | 1.5 | IL 1 | 14 | 1 |
| PS2 | IRL F1 | 1.5 | IL 2 | 14 | 1 |

TABLE 1-continued

Examples of the paper disclosed herein and Control Examples

| Sample (PS = Paper Sample) | Image Receiving Layer | | Intermediate Layer | | Super Calendering No. of Nips |
|---|---|---|---|---|---|
| | Formulation ID | Coat Weight (gsm) | Formulation ID | Coat Weight (gsm) | |
| PS3 | IRL F2 | 1.5 | IL 1 | 14 | 1 |
| PS4 | IRL F2 | 1.5 | IL 2 | 14 | 1 |
| PS5 | IRL F3 | 1.5 | IL 1 | 14 | 1 |
| PS6 | IRL F3 | 1.5 | IL 2 | 14 | 1 |
| PS7 | IRL F3 | 1.5 | IL 1 | 14 | 2 |
| PS8 | IRL F3 | 1.5 | IL 2 | 14 | 2 |
| PS9 | IRL F4 | 1.5 | IL 1 | 14 | 1 |
| PS10 | IRL F4 | 1.5 | IL 2 | 14 | 1 |
| PS11 | IRL F4 | 1.5 | IL 1 | 14 | 2 |
| PS12 | IRL F4 | 1.5 | IL 2 | 14 | 2 |
| PS13 | IRL F5 | 1.5 | IL 3 | 14 | 2 |
| PS14 | IRL F5 | 1.5 | IL 4 | 14 | 2 |
| PS15 | IRL F6 | 1.5 | IL 3 | 14 | 2 |
| PS16 | IRL F6 | 1.5 | IL 4 | 14 | 2 |
| PS Control | Control | 7.0 | — | — | 4* |

*Hot soft nip calendering/production sample

TABLE 2

Image Receiving Layer Formulations (data shown in dry parts)

| Chemicals | Formula | | | | | |
|---|---|---|---|---|---|---|
| | IRL F1 | IRL F2 | IRL F3 | IRL F4 | IRL F5 | IRL F6 |
| Cationic non-film forming polymer | 100 | 100 | 100 | 100 | 50 | — |
| Anionic non-film forming polymer | — | — | — | — | — | 50 |
| Precipitated calcium carbonate | 20 | 40 | 40 | 40 | 50 | 50 |
| styrene/n-butyl acrylate copolymer | — | 3 | 3 | 8 | 3 | 3 |
| Polyvinyl alcohol | 5 | 3 | 3 | 0.5 | 3 | 3 |
| Cross-linker | — | — | 0.5 | 0.6 | 0.5 | 0.5 |
| Slip aid | 1 | 1 | 1 | 1 | 1 | 1 |
| Optical brightener | 0.5 | 0.5 | 0.5 | 0.5 | 0.5 | 0.5 |
| Blue Dye | 0.005 | 0.005 | 0.005 | 0.005 | 0.005 | 0.005 |

TABLE 3

Intermediate Layer Formulations (data shown in dry parts)

| Chemicals | Formula | | | |
|---|---|---|---|---|
| | IL 1 | IL 2 | IL 3 | IL 4 |
| Ground calcium carbonate | 100 | 100 | 30 | 30 |
| Calcined clay | — | — | 30 | 30 |
| Kaolin clay | — | — | 40 | 40 |
| $CaCl_2$ | 10 | 7 | — | 12.75 |
| $MgSO_4$ | — | — | 15 | — |
| Styrene-butadiene based latex | 5 | 5 | 7 | 7 |
| Polyvinyl alcohol | 0.5 | 1.0 | 0.5 | 0.5 |
| Dispersant | 0.15 | 0.15 | 0.2 | 0.2 |
| Defoaming agent | 0.20 | 0.20 | 0.15 | 0.15 |
| Cross-linker | — | — | 0.4 | 0.4 |

TABLE 4

Formulation of paper sample (PS) - Control Sample (data shown in dry parts)

| Formula/Chemicals | Control |
|---|---|
| Calcined clay | 25.7 |
| Delaminated clay | 36.0 |
| Kaolin clay | 38.4 |
| $CaCl_2$ (32%) | 12.8 |
| Styrene-butadiene based latex | 1.93 |
| Defoaming agent | 0.35 |
| Polyvinyl alcohol | 7.0 |
| Cross-linker | 0.58 |
| Optical brightener | 0.5 |
| Violet Dye | 0.0012 |

The gloss level of the paper samples (i.e., the unimaged gloss) was measured using a Micro gloss 75, a gloss meter available from BYK-Gardner.

Several print samples were then made by printing an inkjet ink onto the paper samples using different printers. For instance, prints were made by printing a web-press pigment-based ink using an HP CM8060 MFP printer with HP edgeline technology. Additionally, prints were made by printing a pigment-based ink using HP OfficeJetPro 8000 desktop printer, and other prints were made by printing a dye-based ink using an HP OfficeJet 6500 printer.

After the prints were formed, the durability of the prints was evaluated. This was accomplished by measuring the resistance to finger smudge, and bleed. The finger smudge resistance was tested via finger smudging an orange color print area immediately after printing, and was visually ranked from 1 to 5, where a ranking of 1 had the most amount of visual smudging and a ranking of 5 had the least amount of visual smudging. Bleed was tested using an Image Analyzer from QEA Inc., and was also visually evaluated after printing. The bleed measurements ranked as 1 exhibited acceptable results (e.g., less than 10 mils of color to color bleed) and those ranked as 2 exhibited marginally acceptable results (e.g., greater than 10 mils of color to color bleed). Further, color gamut, black point (L*min), and black optical density (KoD) were also measured using an X-Rite 938 transmission/reflection densitometer. KoD was measured using DEN A settings. Gamut was calculated by measuring the L*a*b* values using D65/2° settings.

The results of the tests for prints formed by printing the web-press pigment-based ink using the HP CM8060 MFP printer are set forth in Table 5 below; the results of the tests for prints formed by printing the dye-based ink using the HP OfficeJet 6500 printer is set forth in Table 6 below; and the results of the tests for prints formed by printing the pigment-based ink using the HP OfficeJetPro 8000 printer are set forth in Table 7 below.

TABLE 5

Test results for prints formed by printing the web-press pigment-based ink using the HP CM8060 MFP printer

| PS (Paper Samples) | Gamut | L*min | KoD | Print (K) Gloss, 75° | Paper Gloss, 75° | Relative Ranking Max Bleed | Finger Smudge |
|---|---|---|---|---|---|---|---|
| PS1 | 250639 | 14.2 | 1.76 | 63.5 | 61.5 | 1 | 5 |
| PS2 | 235855 | 18.8 | 1.58 | 48.2 | 42.6 | 1 | 5 |
| PS3 | 251976 | 16.4 | 1.68 | 62.9 | 63.2 | 1 | 5 |
| PS4 | 260168 | 11.8 | 1.86 | 80.7 | 64.6 | 2 | 5 |

TABLE 5-continued

Test results for prints formed by printing the web-press pigment-based ink using the HP CM8060 MFP printer

| PS (Paper Samples) | Gamut | L*min | KoD | Print (K) Gloss, 75° | Paper Gloss, 75° | Relative Ranking Max Bleed | Relative Ranking Finger Smudge |
|---|---|---|---|---|---|---|---|
| PS5 | 251264 | 17.4 | 1.62 | 56.4 | 48.0 | 1 | 5 |
| PS6 | 249350 | 17.8 | 1.61 | 51.1 | 61.1 | 1 | 5 |
| PS7 | 248464 | 17.3 | 1.65 | 57.0 | 66.9 | 2 | 5 |
| PS8 | 246670 | 17.4 | 1.67 | 56.3 | 67.2 | 2 | 5 |
| PS9 | 252166 | 17.1 | 1.64 | 57.8 | 62.1 | 1 | 5 |
| PS10 | 255374 | 17.0 | 1.65 | 54.7 | 62.1 | 1 | 5 |
| PS11 | 242738 | 17.1 | 1.63 | 58.4 | 65.4 | 1 | 5 |
| PS12 | 247757 | 17.2 | 1.64 | 59.7 | 70.0 | 1 | 5 |
| PS13 | 212565 | 19.7 | 1.54 | 57.7 | 44.7 | 2 | 3 |
| PS14 | 222280 | 18.1 | 1.62 | 67.3 | 69.8 | 2 | 5 |
| PS15 | 228023 | 19.5 | 1.54 | 52.0 | 61.1 | 2 | 3 |
| PS16 | 223185 | 18.0 | 1.62 | 68.8 | 65.2 | 2 | 4 |
| PS Control | 206129 | 20.6 | 1.50 | 29.2 | 21.5 | 2 | 1 |

TABLE 6

Test results for prints formed by printing the dye-based ink using the HP OfficeJet 6500 printer

| PS (Paper Samples) | Gamut | L*min | KoD | Print (K) Gloss, 75° |
|---|---|---|---|---|
| PS1 | 242465 | 30.0 | 1.20 | 43.6 |
| PS2 | 234167 | 31.5 | 1.17 | 44.7 |
| PS5 | 222089 | 32.4 | 1.14 | 46.1 |
| PS6 | 209430 | 34.5 | 1.10 | 37.5 |
| PS Control | 112265 | 44.6 | 0.88 | 12.1 |

TABLE 7

Test results for prints formed by printing the pigment-based ink using the HP OfficeJetPro 8000 printer

| PS (Paper Samples) | Gamut | L*min | KoD | Print (K) Gloss, 75° |
|---|---|---|---|---|
| PS1 | 324068 | 22.2 | 1.46 | 26.3 |
| PS2 | 329911 | 22.4 | 1.48 | 26.3 |
| PS5 | 339609 | 20.5 | 1.55 | 32.5 |
| PS6 | 331311 | 22.1 | 1.48 | 29.2 |
| PS Control | 294777 | 22.3 | 1.47 | 22.5 |

As shown in Table 5 above, print samples 1 through 16 (i.e., those that included the pigment ink fixing agent (i.e., the CaCl$_2$ salt) in the intermediate layer, and a non-film forming polymer in the ink receiving layer) each exhibited significantly better pigment ink print performance (e.g., in terms of optical density and gamut) and durability (e.g., in terms of resistance to finger smudge and bleed) than the control sample, which included only a single layer containing the pigment fixing salt). More particularly, samples PS1-PS16 exhibited i) better finger smudge results than PS control, ii) equal or better Gamut, KoD, and L*min than PS control, iii) equal or better bleed than PS control, and iv) better paper and print (K) gloss than PS control.

As shown in Table 6 above, print samples 1, 2, 5 and 6 (i.e., those that included the pigment ink fixing agent (i.e., the CaCl$_2$ salt) in the intermediate layer, and a cationic non-film forming polymer in the ink receiving layer) each exhibited significantly better dye-ink print performance (e.g., in terms of optical density, gamut, and L*min) than the control sample, which included only a single layer containing the pigment fixing salt.

It is to be understood that the ranges provided herein include the stated range and any value or sub-range within the stated range. For example, an amount ranging from about 0.5 wt % to about 25 wt % should be interpreted to include not only the explicitly recited amount limits of about 0.5 wt % to about 25 wt %, but also to include individual amounts, such as 3 wt %, 4.7 wt %, 22 wt %, etc., and subranges, such as 2 wt % to 19 wt %, etc. Furthermore, when "about" is utilized to describe a value, this is meant to encompass minor variations (up to +/−5%) from the stated value.

It is further to be understood that, as used herein, the singular forms of the articles "a," "an," and "the" include plural references unless the content clearly indicates otherwise, both in the specification and the claims.

While several examples have been described in detail, it will be apparent to those skilled in the art that the disclosed examples may be modified. Therefore, the foregoing description is not to be considered limiting.

What is claimed is:

1. An inkjet recording medium, comprising:
    a substrate;
    an intermediate layer disposed on the substrate, the intermediate layer including:
        a binder;
        an inorganic pigment; and
        a pigment ink fixing agent chosen from divalent salts, multivalent salts, and combinations thereof;
    wherein the intermediate layer is a surface sizing layer including a greater amount of the binder than of the inorganic pigment; and
    an ink receiving layer disposed on the intermediate layer, the ink receiving layer including:
        a non-film forming polymer, wherein the non-film forming polymer has a glass transition temperature ($T_g$) ranging from about 80° C. to about 150° C.;
        a binder chosen from any of water dispersible binders or water soluble binders; and
        a pigment.

2. The inkjet recording medium as defined in claim 1 wherein the non-film forming polymer is i) a cationic polymer chosen from non-film forming cationic acrylic polymers and non-film forming cationic styrene-acrylic polymers, ii) an anionic polymer chosen from non-film forming anionic acrylic polymers and non-film forming anionic styrene-acrylic polymers, and iii) combinations thereof.

3. The inkjet recording medium as defined in claim 1 wherein: the non-film forming polymer is a cationic polymer having a zeta potential (ZP) ranging from about +1 mV to about +60 mV, or the non-film forming polymer is an anionic polymer having a zeta potential (ZT) ranging from about −1 mV to about −60 mV.

4. The inkjet recording medium as defined in claim 1 wherein the substrate is chosen from pulp-based substrates, fiber-based substrates, polymer-based substrates, film-based substrates, photobase substrates, and coated substrates.

5. The inkjet recording medium as defined in claim 1 wherein the ink receiving layer has a pH ranging from about 3 to about 9.

6. An inkjet recording medium, comprising:
    a substrate;
    an intermediate layer disposed on the substrate, wherein the intermediate layer is a surface sizing layer having a coat weight ranging from about 1 gsm to about 5 gsm and wherein the intermediate layer includes:

a binder;
an inorganic pigment; and
a pigment ink fixing agent chosen from divalent salts, multivalent salts, and combinations thereof;
wherein the binder is present in an amount greater than an amount of the inorganic pigment, the binder amount ranging from about 40 wt % to about 98 wt % of the surface sizing layer, and the inorganic pigment amount ranging from about 1 wt % to about 20 wt % of the surface sizing layer; and
wherein the pigment ink fixing agent is present in an amount ranging from about 1 wt % to about 50 wt % of the surface sizing layer; and
an ink receiving layer disposed on the intermediate layer, the ink receiving layer including:
a non-film forming polymer, wherein the non-film forming polymer has a glass transition temperature ($T_g$) ranging from about 80° C. to about 150° C.;
a binder chosen from any of water dispersible binders or water soluble binders; and
a pigment.

7. The inkjet recording medium as defined in claim 1 wherein:
the non-film forming polymer of the ink receiving layer is present in an amount ranging from about 20 wt % to about 87 wt % of the ink receiving layer;
the binder of the ink receiving layer is present in an amount ranging from about 3 wt % to about 15 wt % of the ink receiving layer; and
the pigment of the ink receiving layer is present in an amount ranging from about 10 wt % to about 77 wt % of the ink receiving layer.

8. The inkjet recording medium as defined in claim 1 wherein the ink receiving layer has a coat weight ranging from about 0.3 gsm to about 10 gsm.

9. The inkjet recording medium as defined in claim 1 wherein:
the binder of the intermediate layer is chosen from a water dispersible latex and a water soluble binder;
the inorganic pigment of the intermediate layer is chosen from kaolin clays, calcined clays, engineered clays, treated clays, calcium carbonates, talc, titanium dioxide, zeolites, calcium sulfates, silicas, aluminas, silicates, aluminum trihydrate, and combinations thereof; and
the pigment ink fixing agent of the intermediate layer is chosen from a divalent or multivalent salt of any metal in Periodic Table Group I, a divalent or multivalent salt of any metal in Periodic Table Group II, a divalent or multivalent salt of any metal in Periodic Table Group III, and a divalent or multivalent salt of any transition metal.

10. The inkjet recording medium as defined in claim 1 wherein:
the binder of the ink receiving layer is a water dispersible latex; and
the pigment of the ink receiving layer is chosen from kaolin clays, calcined clays, engineered clays, calcium carbonates, talc, titanium dioxide, zeolites, calcium sulfates, silicas, aluminas, silicates, aluminum trihydrate, and combinations thereof.

11. A method of making an inkjet recording medium, comprising:
forming an intermediate layer on a surface of a substrate, the intermediate layer including a binder, an inorganic pigment, and a pigment ink fixing agent, the pigment ink fixing agent being chosen from divalent salts and multivalent salts, wherein the intermediate layer is a surface sizing layer including a greater amount of the binder than of the inorganic pigment; and
forming an ink receiving layer on the intermediate layer, the ink receiving layer including:
a non-film forming polymer chosen from an anionic non-film forming polymer and a cationic non-film forming polymer, wherein the non-film forming polymer has a glass transition temperature ($T_g$) ranging from about 80° C. to about 150° C.;
a binder chosen from any of water dispersible binders or water soluble binders; and
an inorganic pigment.

12. The method as defined in claim 11 wherein the cationic non-film forming polymer is chosen from non-film forming cationic acrylic polymers and non-film forming cationic styrene-acrylic polymers, and wherein the cationic non-film forming polymer has a zeta potential (ZP) ranging from about +1 mV to about +60 mV.

13. The method as defined in claim 11 wherein the anionic non-film forming polymer is chosen from non-film forming anionic acrylic polymers and non-film forming anionic styrene-acrylic polymers, and wherein the anionic non-film forming polymer has zeta potential (ZT) ranging from about −1 mV to about −60 mV.

14. The inkjet recording medium as defined in claim 1, further including an additional layer disposed between the substrate and the intermediate layer, wherein the additional layer includes an additional layer binder and an additional layer inorganic pigment.

15. An inkjet recording medium, comprising:
a substrate;
an intermediate layer disposed on the substrate, the intermediate layer including:
a binder;
an inorganic pigment; and
a pigment ink fixing agent chosen from divalent salts, multivalent salts, and combinations thereof; and
an ink receiving layer disposed on the intermediate layer, the ink receiving layer including:
a non-film forming polymer, wherein the non-film forming polymer has a lass transition temperature ($T_g$) ran in from about 80° C. to about 150° C.
a binder chosen from any of water dispersible binders or water soluble binders; and
a pigment;
wherein:
the binder of the intermediate layer is a combination of styrene-butadiene copolymer latex and polyvinyl alcohol;
the pigment ink fixing agent is magnesium sulfate or calcium chloride; and
the inorganic pigment is ground calcium carbonate or a combination of ground calcium carbonate, calcined clay, and kaolin clay.

16. The inkjet recording medium as defined in claim 1 wherein:
the intermediate layer consists of the binder, the inorganic pigment, and the pigment ink fixing agent; and
the ink receiving layer consists of the non-film forming polymer, the binder, and the pigment.

17. The inkjet recording medium as defined in claim 1 wherein the inorganic pigment is selected from the group consisting of kaolin clays, calcined clays, engineered clays, calcium carbonates, talc, titanium dioxide, zeolites, calcium sulfates, and aluminum trihydrate.

18. The inkjet recording medium as defined in claim 6 wherein:
- the binder of the intermediate layer is chosen from a water dispersible latex and a water soluble binder;
- the inorganic pigment of the intermediate layer is chosen from kaolin clays, calcined clays, engineered clays, treated clays, calcium carbonates, talc, titanium dioxide, zeolites, calcium sulfates, silicas, aluminas, silicates, aluminum trihydrate, and combinations thereof;
- the pigment ink fixing agent of the intermediate layer is chosen from a divalent or multivalent salt of any metal in Periodic Table Group I, a divalent or multivalent salt of any metal in Periodic Table Group II, a divalent or multivalent salt of any metal in Periodic Table Group III, and a divalent or multivalent salt of any transition metal;
- the binder of the ink receiving layer is chosen from acrylic polymers, acrylic copolymers, vinyl acetate latex, polyesters, vinylidene chloride latex, styrene-butadiene copolymer latex, styrene/n-butyl acrylate copolymer, acrylonitrile-butadiene copolymer latex, polyvinyl alcohol, polyvinyl acetates, starches, gelatin, celluloses, and acrylamide polymers; and
- the pigment of the ink receiving layer is chosen from kaolin clays, calcined clays, engineered clays, calcium carbonates, talc, titanium dioxide, zeolites, calcium sulfates, silicas, aluminas, silicates, aluminum trihydrate, and combinations thereof.

* * * * *